Jan. 10, 1961  D. F. McCORMACK  2,967,455
MICROPHOTO APPARATUS
Filed Feb. 7, 1958  2 Sheets-Sheet 1

INVENTOR
DWIGHT F. McCORMACK
BY Charles S. Evans
his ATTORNEY

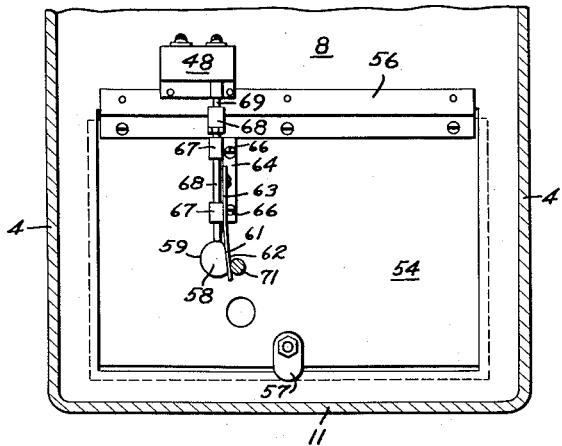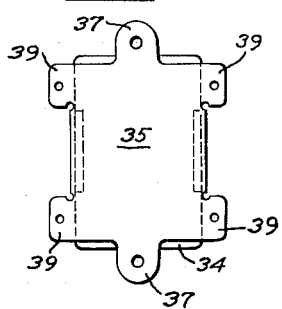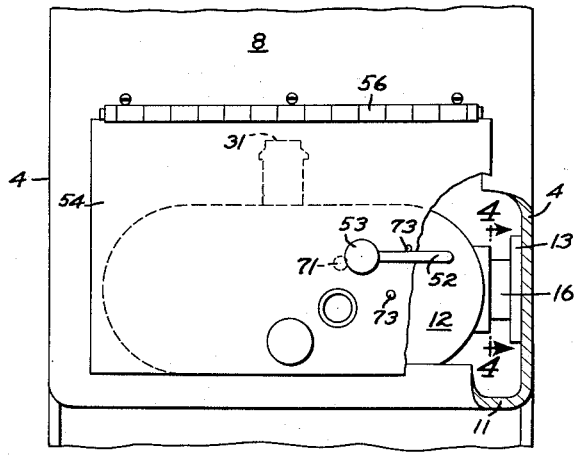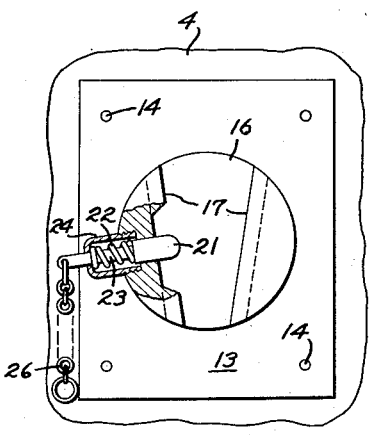

United States Patent Office 2,967,455
Patented Jan. 10, 1961

2,967,455

MICROPHOTO APPARATUS

Dwight F. McCormack, 150 Alta Vista Drive, Atherton, Calif.

Filed Feb. 7, 1958, Ser. No. 713,923

3 Claims. (Cl. 88—24)

My invention relates to photocopying apparatus, and particularly to microphoto apparatus for photocopying checks presented for encashment and identification documents of the endorser.

One of the objects of my invention is the provision of a microphoto apparatus in which the material to be photographed may be easily and quickly photographed with a minimum of inconvenience to operator and customer.

Another object of the invention is the provision of a microphoto apparatus simple enough to be operated by inexperienced personnel.

Still another object is the provision of a microphoto apparatus which is light and easily portable and readily serviced.

The invention possesses other objects some of which with the foregoing will be brought out in the following description of the invention. I do not limit myself to the showing made by the said description and the drawings, since I may adopt variant forms of the invention within the scope of the appended claims.

Referring to the drawings:

Fig. 2 is a sectional view taken in the plane indicated by the line 2—2 of Fig. 1.

Fig. 3 is a fragmentary front elevational view partly in section, taken in the direction of arrow 3 in Fig. 1.

Fig. 4 is a fragmentary elevational view of the camera locking means. The direction of the view is indicated by the line 4—4 of Fig. 3, and a portion of the structure is broken away to disclose underlying parts.

Fig. 5 is a plan view of the adjustable mirror shown removed from the assembly.

Figure 1:
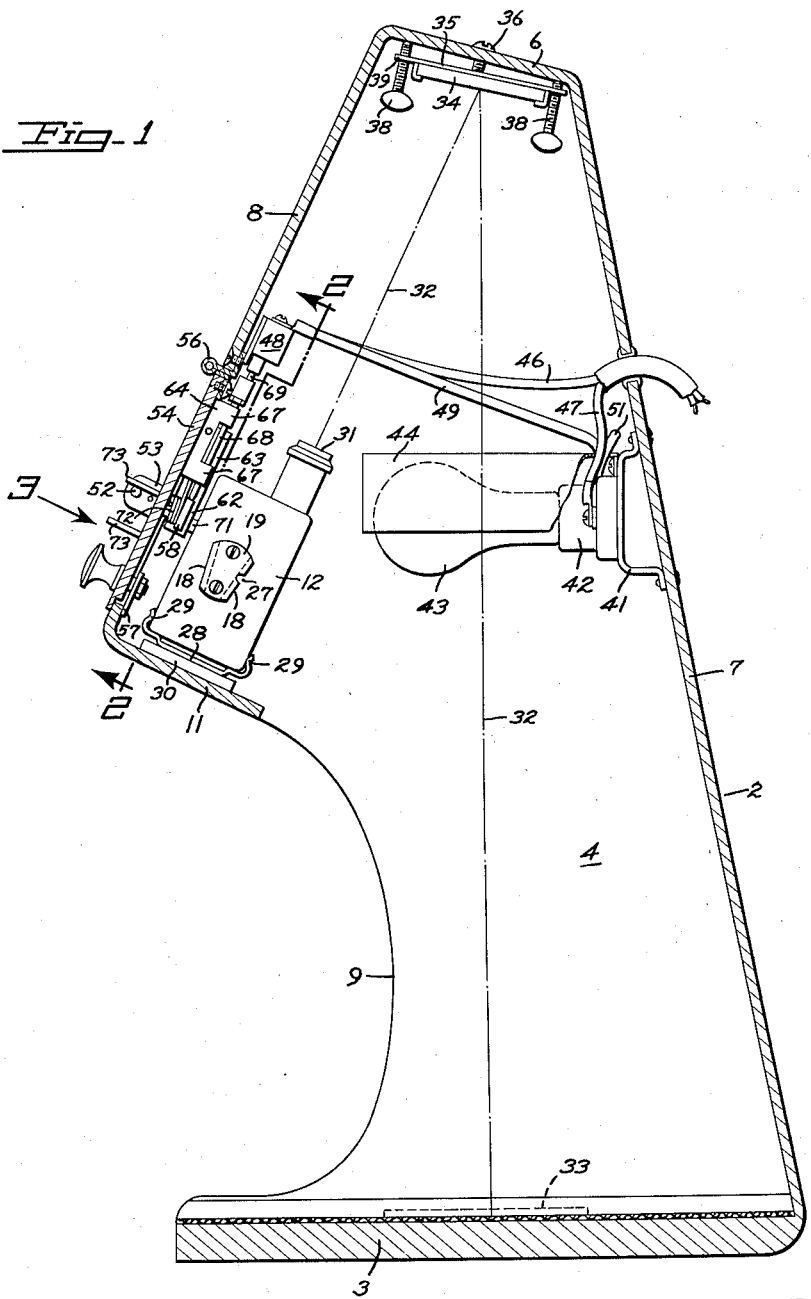
Fig. 1 is a vertical sectional view showing the housing broken away to reveal the underlying structure.

One of the problems which face retail merchants is the one created by people, honest and dishonest, who pay for purchases by means of checks and negotiable drafts of various kinds. In a busy retail grocery store for instance, people customarily present checks for payment of groceries after the cashier has registered the sale of many items on the cash register. If the customer is unknown to the cashier, time must be taken to verify the check and secure identification from the customer. If verification cannot be secured, the check should not be accepted, however, to refuse the check will usually lose the sale. This results in the necessity of an accounting adjustment to offset the registered items, and also requires the expenditure of a clerk's time in replacing groceries on display shelves.

A more serious problem must be faced by a package liquor store proprietor who has sold liquor to a minor after examining identification papers which have been altered so as to not reflect the true age of the purchaser. Unless the proprietor can prove that he sought and was shown evidence of age by the purchaser, he may be forced to close his store for a specified period or pay a heavy fine.

Both of these problems are obviated by use of my microphoto apparatus. In the first instance, the cashier need only photograph the check presented, together with identification papers of the customer, which oftentimes include a photograph, and he will be assured of all necessary data for tracing the customer or filing a claim for insurance should the check be returned by the bank unpaid. In the case of the liquor store proprietor, he is usually relieved of all responsibility in the transaction if he can prove his own good faith by producing a microfilm displaying the altered identification evidence. The microphoto apparatus of my invention may be used in many other applications, such as the consolidation of records and the recordation of bank deposits.

Broadly considered, the microphoto apparatus of my invention comprises an upright hollow housing which conveniently may be placed on a grocery counter near a cash register and within easy reach of the cashier. The housing is provided with a base, and one wall of the housing is apertured to give access to the interior of the housing and base. Detachably mounted within the housing is a camera aimed at a mirror appropriately positioned to reflect toward the camera the image of an object, such as a check, which is placed on the base within the housing. Means are provided on the housing operable from the outside thereof for operating the camera shutter to photograph the image of the object on the base.

In more specific detail, the microphoto apparatus of my invention comprises an upright hollow housing 2, conveniently fabricated from metal, wood or composition board to achieve lightness and portability. The housing is formed with a relatively heavy base 3, which lends stability to the structure, vertical side walls 4 extending upwardly from the base and joined at their upper ends by a top wall 6. A wall 7 joins the rear edges of the side walls 4 to close the back of the housing, and a front wall 8 joins the front edges of the side walls over a portion of their length. The front edges of the side walls are cut back as at 9, and the front wall 8 terminates in a right angle portion 11, which serves to support a camera 12 locked within the housing, and with the base and side walls defines an aperture in the front wall giving access to the interior of the housing.

The camera is conveniently a sixteen millimeter motion picture camera adapted for single frame operation. The camera is detachably secured within the housing by complementary fastening means on the camera and one of the side walls 4. The fastener on the side wall comprises a metal plate 13 secured to the side wall by any suitable means such as countersunk screws 14, and having a grooved block 16 centrally positioned and fixed thereon. The groove in the block is formed with longitudinally converging sides 17 which are undercut to complement the undercut and converging sides 18 of a wedge block 19 fixed on one end of the camera. Slipping the wedge block 19 into the socket formed by the grooved block 16 thus insures that the camera will be held immobile during operation.

Accidental displacement of the camera is prevented by a detent pin 21 extending laterally into the socket of block 16. A spring 22 on a reduced shank portion 23 of the pin, works against the outer end of a bearing cap 24 threaded into the side of the block 16. A chain 26 fastened to the outer end of the reduced shank portion 23 and hanging free within the housing provides means for retracting the end of the detent pin 21 from a complementary depression or detent socket 27 formed in the side of the wedge block 19. The detent pin 21 automatically engages the socket 27 when the wedge block 19 is inserted into the socket block 16. The camera is additionally supported against movement by a spring clip 28 having resilient arms 29 grasping opposite sides of the camera. The clip is fastened on a plate 30 as by spot welding, and the plate is fixed on the front wall portion 11 intermediate the side walls. The camera thus lies cradled in the resilient clip and is firmly supported against inadvertent displacement.

As shown in Fig. 1, the camera is equipped with a lens 31 aimed upwardly toward the top wall 6 of the housing. Means are provided on the top wall for reflecting into the camera lens, as shown schematically by the dash lines 32, the image of an object 33, such as a check placed on the base within the housing. Such means comprise a mirror 34 fixed in the sheet metal frame 35, adjustably secured to the interior of the top wall 6 by screws 36 engaging lugs 37 on the frame. Thumb screws 38 extending upwardly through frame lugs 39 projecting from opposite edges of the frame, provide means for tilting the mirror to provide varying angles of reflection between the base and camera. It will thus be apparent that an object 33 such as a check, identification card or driver's license displayed on the base will have its image reflected toward the camera by the mirror.

Incandescent light means are provided within the housing to uniformly illuminate the object to be photographed. Fixed on the rear wall of the housing adjacent each side wall is a mounting bracket 41, each bracket forming a base for an electric socket element 42, each socket having an electric lamp 43 threaded thereinto and provided with a reflector hood 44 directing the light rays downwardly toward the base. The lamps are energized through leads 46 and 47, the lead 46 extending to one pole of a micro-switch 48 mounted on the front wall 8, and which controls the operation of the lamps. A lead 49 extending from the other pole of the micro-switch back to the lamps, which are interconnected for simultaneous operation by a shunt lead 51, completes the electrical circuit.

Operation of the lamps and camera to photograph an object placed on the base is accomplished by manipulation of a lever arm or handle 52 outside the housing and rotatably journaled by shaft 53 on the door 54, hinged to the front wall by hinge 56. The door closes an aperture in the front wall which gives access to the camera, and may be locked by a latch 57 pivotally mounted on the door adjacent its lower edge and rotatable to engage the housing wall.

On the inside of the door, the journal shaft 53 is provided with a cam 58 having a circular peripheral face 59 which has been ground off on one side of center to provide a flat face 61. Impinging against the flat cam face 61 is the free end 62 of a stiffly resilient leaf spring 63, fixed at its other end to bracket 64. The bracket 64 is fixed to the inner surface of the door by screws 66, and is provided with spaced and aligned lugs 67, forming bearings to slidably accommodate a plunger pin 68. The lower end of the plunger pin is rounded and normally rests on the circular peripheral face 59 of the cam 58, adjacent one end of the flat face 61. The upper end of the plunger pin is positioned against and depresses the actuating pin 69 of micro-switch 48, when the door is in its closed position as shown, and holds the micro-switch in an "OFF" condition.

To operate the camera, the lever 52 is manipulated, thus rotating the cam 58 counterclockwise as viewed in Fig. 2. This rotary movement of the cam effects the displacement of the leaf spring, which in turn presses against lug 71 on the camera, displacing it to effect opening of the camera shutter. Rotary movement of the cam also causes the rounded lower end of plunger pin 68 to ride onto the flat face 61 of the cam, thus permitting the upper end of the plunger pin to fall away from the microswitch actuating pin 69, which closes a circuit through the switch and activates the lamps. Preferably the parts are proportioned to cause activation of the lamps an instant before the camera shutter is opened. A coil spring 72 operatively interposed between the cam and bracket 64 insures recovery of the cam and handle to their former positions. Stop pins 73 on the outside of the door are positioned to limit movement of the handle.

As seen in Figs. 1 and 2, physical contact between the upper end of the plunger pin 68 and the micro-switch pin 69 occurs opposite the hinge line of the door. With the parts so related, opening of the door swings the plunger pin and cam assembly outwardly, and the plunger pin falls away from the micro-switch operating pin, thus causing the circuit through the switch to be completed and the lamps activated. The interior of the housing is thus well illuminated whenever the door is open. Closing the door restores the operative relationship of the plunger pin and micro-switch, and breaks the lamp circuit, which must be completed by manipulation of the operating handle.

I claim:

1. A microphoto apparatus comprising a hollow housing having a base, a camera detachably mounted within the housing and having a shutter actuating lug, a mirror within the housing positioned to reflect an image from the base toward the camera, an outwardly opening door pivoted on one wall of the housing to give access to the camera, and means for operating the camera mounted on the door and operatively related to the shutter actuating lug of the camera when the door is closed and non-operatively related thereto when the door is open.

2. The combination according to claim 1, in which electric lamp means are mounted within the housing and activated sequentially with operation of said camera by said camera operating means to illuminate the base and an object placed thereon, said door when opened to non-operatively relate the shutter actuating lug with the camera operating means effecting automatic activation of the lamp means to illuminate the interior of the housing.

3. A microphoto apparatus comprising a hollow housing having a base, back and side walls fixed at their lower ends to the base and extending upwardly therefrom, a top wall joining the upper ends of the back and side walls, an apertured front wall joining an upper portion of the side walls and the top wall and terminating at its lower end at a point spaced from the base to enclose the upper end of the housing and provide access to the interior of the housing, a door hinged on the front wall and normally closing the aperture therein, a camera detachably mounted within the housing on one of the side walls and having a shutter actuating lug, a mirror adjustably mounted on the top wall within the housing in position to reflect toward the camera the image of an object placed on the base, and camera operating means on the door operatively related to the shutter actuating lug of the camera when the door is closed.

References Cited in the file of this patent

UNITED STATES PATENTS

| 1,934,582 | Bausch et al. | Nov. 7, 1933 |
| 1,974,174 | Chamberlain | Sept. 18, 1934 |
| 2,470,844 | Brownscombe | May 24, 1949 |
| 2,578,037 | Berlant | Dec. 11, 1951 |

FOREIGN PATENTS

| 3,058 | Great Britain | of 1903 |
| 526,296 | Great Britain | Sept. 13, 1940 |
| 613,912 | Great Britain | Dec. 7, 1948 |